Jan. 10, 1939.  G. SWIFT  2,143,094
ELECTRICAL TESTING INSTRUMENT
Filed May 29, 1937  4 Sheets-Sheet 2
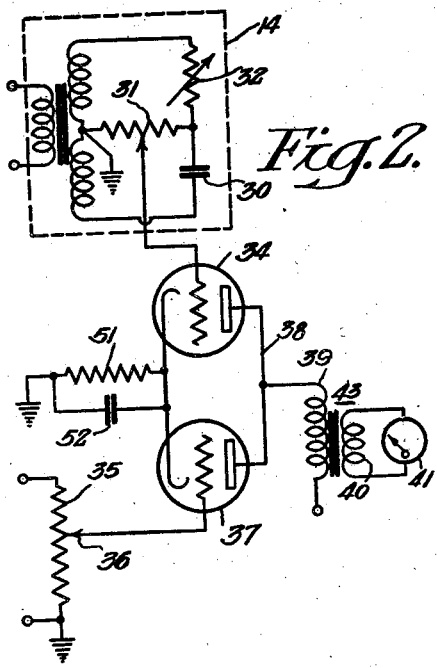
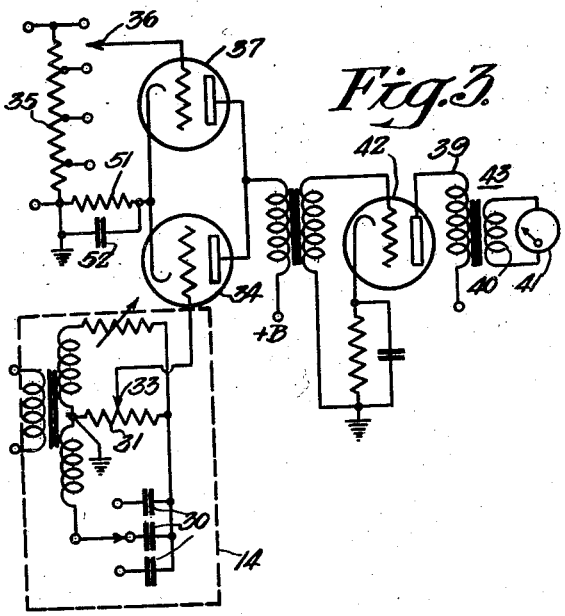
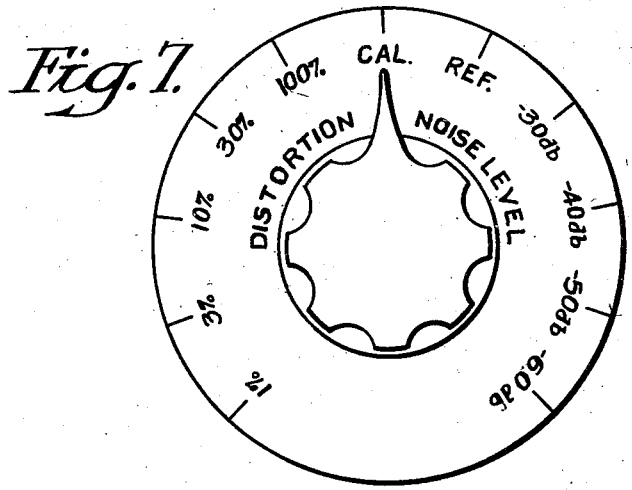
Inventor
Gilbert Swift
By
J. J. Suff
Attorney Jan. 10, 1939.  G. SWIFT  2,143,094
ELECTRICAL TESTING INSTRUMENT
Filed May 29, 1937  4 Sheets-Sheet 3
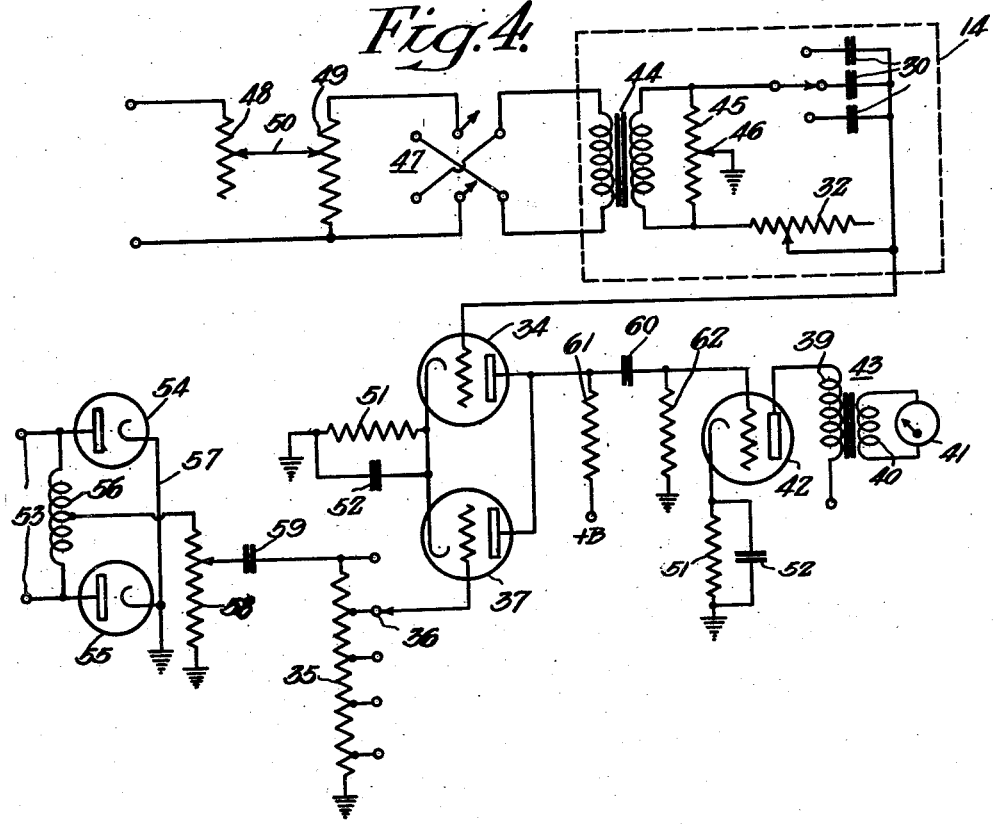
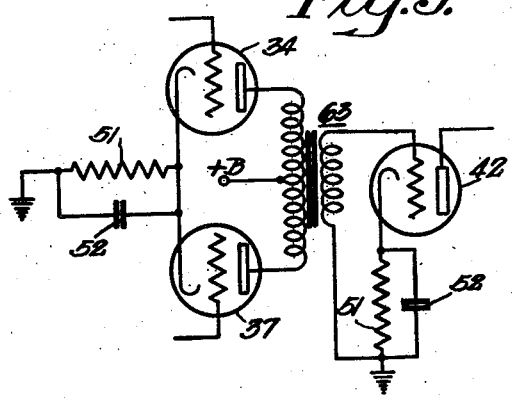
Inventor
Gilbert Swift
By
Attorney

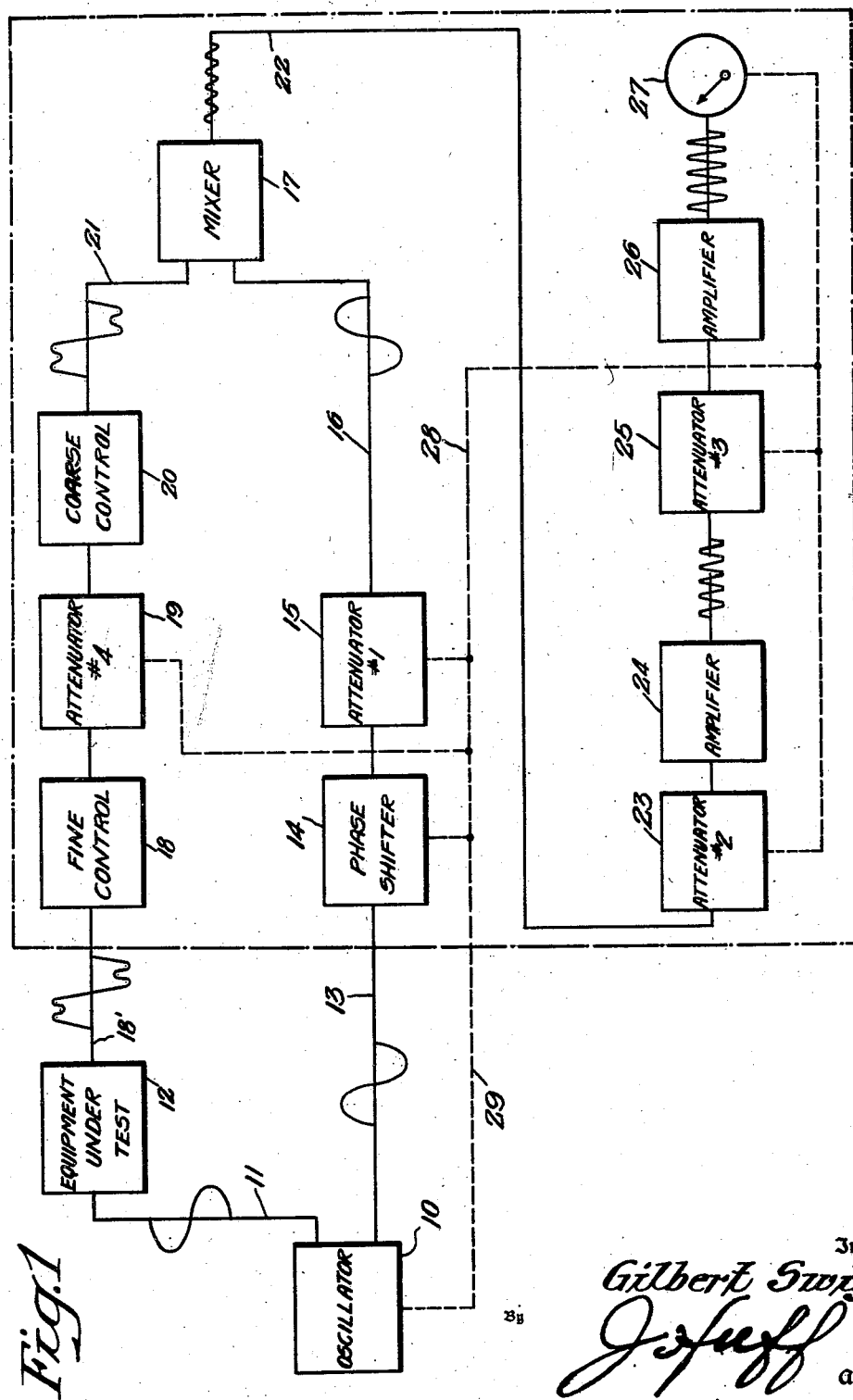

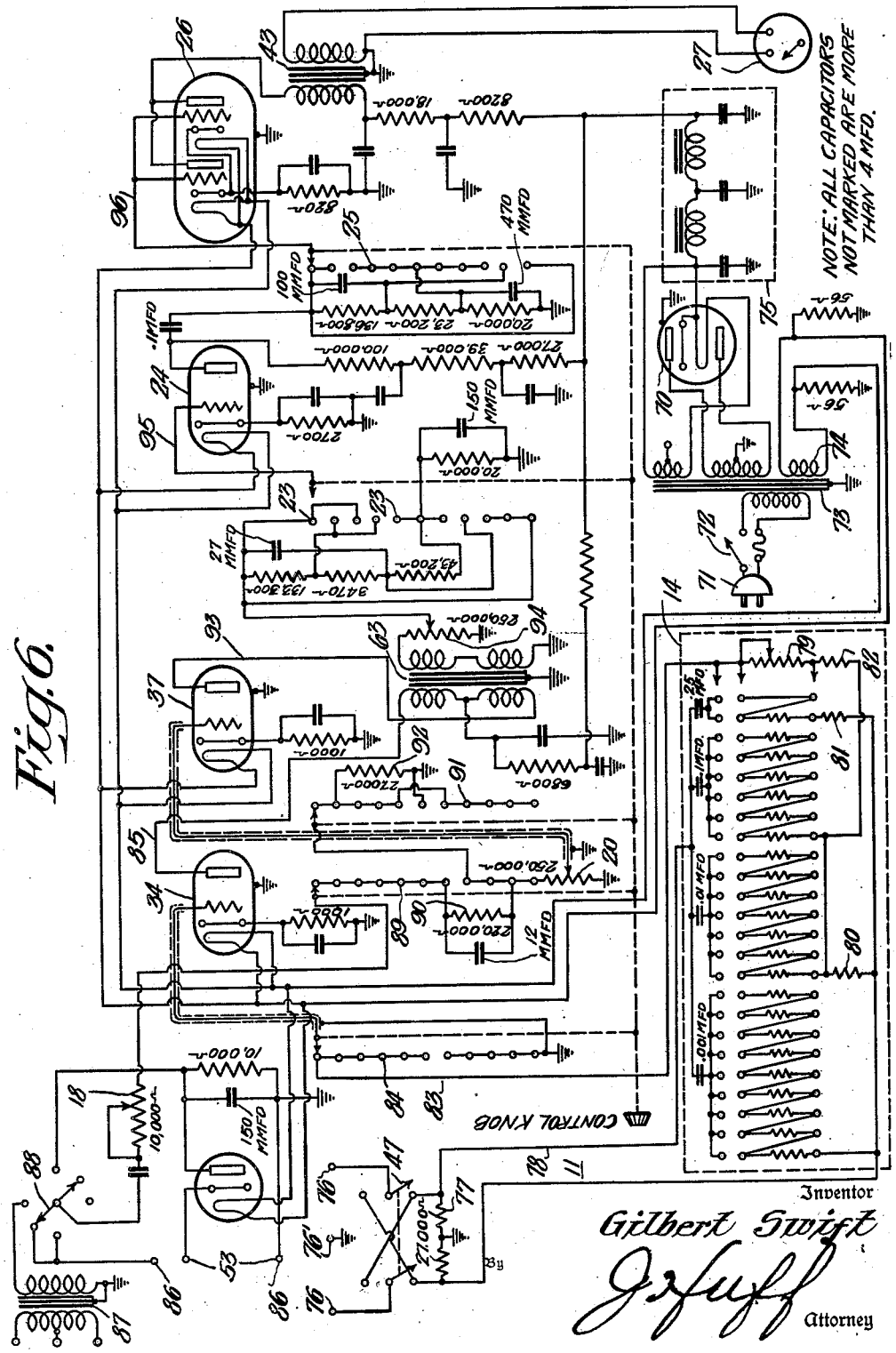

Patented Jan. 10, 1939

2,143,094

UNITED STATES PATENT OFFICE 2,143,094

ELECTRICAL TESTING INSTRUMENT

Gilbert Swift, Philadelphia, Pa., assignor to Radio Corporation of America, a corporation of Delaware Application May 29, 1937, Serial No. 145,523

13 Claims. (Cl. 179—175)

This invention relates to a new and useful apparatus for the measurement of distortion and more particularly for the measurement of non-linear distortion in audio frequency apparatus.

It is well known in the art that most electrical apparatus for the transmission of audio frequency currents produces distortion either of the non-linear type or other distortion of the wave being transmitted and it is further known that the amount of this distortion depends upon the frequencies.

There have heretofore been many ways proposed for measuring non-linear distortion which have not been entirely satisfactory for one reason or another. In practically all of the devices of the prior art, some distortion was introduced by the testing apparatus and was included in the apparent results produced thereby, as, for example, in oscillographs and oscilloscopes. In other apparatuses, the proper functioning of the apparatus was dependent upon the assumption that the wave transmitted to the apparatus or the comparison wave or both was a pure sine wave and this assumption was rarely, if ever, justified. In my improved apparatus all the foregoing difficulties are avoided and the functioning of the apparatus is rendered independent of the comparison wave shape within practical limits.

In the performance of my invention I use an oscillator of any appropriate type which gives a reasonably satisfactory sine wave. If the wave is obviously misshapen or obviously includes harmonics, it is, of course, unsuitable for the purpose. However, any good laboratory type of oscillator gives a sufficiently good wave form for the purpose, although the better the oscillator, the more dependable are the results. I feed a portion of the output of this oscillator into my apparatus where it is shifted in phase and attenuated and I feed another portion of the output of the oscillator through the apparatus under test and into my apparatus where it is attenuated to an extent bringing it as nearly as possible to the amplitude of the wave fed directly from the oscillator. I then add these waves in opposite phase, preferably in a vacuum tube mixer, adjusting the phase and amplitude until a minimum output is attained, and read the value of the residual current on an appropriate meter. Since the same wave is used for transmission through the equipment under test and for balancing out the wave transmitted by that equipment, any errors in the original wave shape tend to be cancelled out and the resulting current corresponds only to the distortion produced by the equipment under test.

It is desirable, in order to bring the output of the apparatus to such a value that it may be readily read on a rugged and dependable meter, to amplify the residual current after mixing to bring it properly within the range of such meter as may be used and appropriate attenuators and amplifiers are accordingly provided. Also, since the equipment being tested will shift the phase of the wave a certain amount in one direction or the other, it is necessary that the phase shifter be adjustable, and since the equipment being tested may be either of the amplifying or attenuating type, appropriate means are provided for adjusting the output of that apparatus to match the input to the test apparatus from the oscillator.

One object of my invention is to provide a comparatively rugged and simple distortion meter.

Another object of my invention is to provide means for testing non-linear distortion without the use of an oscillograph or equivalent apparatus.

Another object of my invention is to provide means for testing non-linear distortion which will be substantially independent of the shape or frequency of the test wave used.

Other and incidental objects of my invention will be apparent to those skilled in the art from a reading of the following specification and from an inspection of the accompanying drawings, in which—

Figure 1 is a block diagram of the arrangement of several elements of a commercial form of my apparatus, Figure 2 is a schematic diagram of a simplified form of the apparatus, Figure 3 is a diagram of a form of the apparatus corresponding somewhat to Fig. 2 but including an output amplifier, Figure 4 is a diagram of another form of the apparatus, Figure 5 is a schematic diagram of an inductive mixer as distinguished from the conductive mixers of Figs. 2 and 3, and Figure 6 is a schematic diagram of a commercial form of the apparatus.

Referring first to the block diagram in Fig. 1: An oscillator 10 of any appropriate type as before described is provided as a source of sine waves. From this oscillator a portion of the output passes through the transmission line 11 to the apparatus or equipment 12 which is under test and another portion of the output passes through the transmission line at 13 to my testing apparatus. As indicated in the drawings, the output from the oscillator through the lines 11 and 13 is in the form of a sine wave of any desired frequency.

From the line 13 the current passes into the phase shifter 14 and thence to the attenuator 15. From the attenuator 15 the sine wave still undistorted passes through the line 16 to the mixer 17. It will be apparent from the indication on the line 16 that this sine wave has been shifted 180° in phase shifter.

After passing through the equipment under test, the output therefrom passes through the line 18' into my testing apparatus reaching first the control unit 19. It will be apparent that the waves passing through the line 18' include such distortion as may have been introduced by the equipment under test, a typical form of distortion, rather exaggerated, being indicated. From the unit 18 this current to be tested passes to the attenuator 19 and thence to the coarse control 20, emerging therefrom through the line 21 as a wave of the same form as put out by the equipment under test and with an amplitude of its fundamental frequency corresponding to the amplitude of the wave put out through the line 16 to the mixer but in directly opposite phase thereto. Since the currents through the lines 16 and 21 are equal in amplitude and opposite in phase, the output from the mixer into the line 22 will represent only the differences between these waves and will therefore represent the distortion of the wave in the equipment under test.

From the mixer 17 the output passes through this line 22 to the attenuator 23, thence to the amplifier 24, where its amplitude is increased as indicated, thence to the attenuator 25, the amplifier 26 to the meter 27. As indicated by the dash line 28 the controls of the attenuators 15, 19, 23 and 25 are mechanically connected together in order that the settings of these attenuators may at all times correspond. The attenuators 23 and 25 are provided preceding the amplifiers 24 and 26, respectively, in order that these amplifiers may at all times work on an appropriate portion of the characteristic curve of their tubes, thereby increasing the accuracy of the results. If the two attenuators preceded the two amplifiers then at low amplitudes the input to the amplifier would be too low and at high amplitudes the output tubes would be overloaded.

The meter 27 may be of any appropriate type according to the manner in which the results are to be read. For ordinary test purposes, I prefer to use an R. M. S. meter, preferably of the rectifier-voltmeter type but any other meter may be substituted according to the type of indication desired. For example, it might be desirable in some instances to substitute a peak reading voltmeter or in other instances it might be desirable to substitute a watt meter or watt hour meter. Likewise, if it be desired to use the apparatus as a curve plotting device a recording meter, such as a voltmeter, might be used and the phase shifter interconnected with the attenuators and oscillators, as indicated by the dotted lines 29, and to the shifting mechanism of the recorder so that a continuous curve of distortion over the entire frequency range of the apparatus would be directly plotted. However, since the various types of meters which might be used to indicate or record the results form no part of my invention, they are not specifically described here.

Referring now to Fig. 2, which shows schematically a simplified form of apparatus according to my invention, the phase shifter 14 as shown schematically consists of a transformer having a single primary and two secondaries connected in series, the middle tap thereof being grounded.

From one end of one secondary connection is made through the condenser 30 to the resistor 31 which returns to the center tap of the secondary while the other portion of the secondary is connected through the variable resistor 32 to the end of the resistor 31. Since the center tap of the secondary is grounded the waves tending to be produced through the resistor 31 from the two halves of the secondary tend to be in direct opposition. The condenser 30, however, produces a phase shift in one-half of the secondary and the phase relation of the voltage taken from the adjustable tap 33 on the potentiometer 31 to the voltage fed to the primary of the transformer depends on the adjustment of the resistor 32. The output from this phase shifter which, as stated above, is fed directly from the oscillator is applied to the grid of the tube 34.

The output from the apparatus under test is applied across the potentiometer 35 and since the one end of this resistor is grounded and the cathodes of the tubes are grounded (through resistor 51) the amplitude of the signal taken off from this resistor is determined by the position of the movable contact 36. This output is applied to the tube 37, the cathode of which is connected to the cathode of the tube 34 and the plate of which is directly connected to the plate of the tube 34 through the lead 38. The sum of the plate outputs of the tubes 34 and 37 is passed through the primary 39 of the transformer, the secondary 40 of which is connected to the meter 41. It will be apparent that, although the range of this apparatus is limited by the range of the meter 41 and the sensitivity of the tubes 34 and 37, it will operate in the manner above described in connection with Fig. 1, i. e., the output from the apparatus under test is fed at proper amplitude to the tube 37 and the undistorted sine wave is fed through the phase shifter 14 to the tube 34 in phase opposition thereto, the output current through the primary of the transformer 39 corresponding to the distortion produced in the apparatus under test.

In the form of the apparatus shown in Fig. 3, the general arrangement is the same as that shown in Fig. 2 but in the phase shifter 14 a bank of condensers which may be selectively used is indicated at 30 in place of the fixed condenser shown in Fig. 2, the phase shifter being otherwise the same. Likewise, in this figure the resistor 35 is indicated as being provided with fixed taps instead of being continuously variable. In addition to this, a further amplifying tube 42 is provided which is connected in place of the meter shown in Fig. 2 and which, in turn, feeds the meter through an appropriate transformer 43.

The form of the device shown in Fig. 4 is intended for the measurement of the distortion of the audio frequency modulation in radio frequency apparatus and the construction thereof is accordingly somewhat different from the preceding forms. In this arrangement, the output from the oscillator is fed through the resistor 48 and the pair of movable contacts 50 to the potentiometer 49, these resistors 48 and 49 serving as an attenuator for the input from the oscillator. The sine wave current from the oscillator, after leaving the potentiometer 49, passes through the reversing switch 47 to the transformer 44 in the phase shifter 14. This transformer 44, instead of being center tapped, as in Figs. 2 and 3, is provided with a resistor 45 across the primary which is grounded through a movable center tap 46, one lead from the transformer being connected to the condenser bank 30 and the other lead to the variable resistor 32. The output from this phase shifter passes to the tube 34, as in the other forms of the invention. The radio frequency input is applied to the terminals 53 whence it passes to the rectifiers 54 and 55 arranged in push-pull, and the rectified current representing the modulation of the RF current is taken off through the inductance 56, the cathodes of the rectifiers being grounded as indicated at 57.

Although a push-pull rectifier is shown, it will be apparent that a single rectifier may be used. The output from the rectifiers is applied to the resistor 58, which is provided with a movable contact, and from this movable contact the current is passed through the condenser 59 to the resistor 35 which functions as in the forms of the invention above described.

The mixer tubes 34 and 37 function in the same manner as described in connection with Figs. 2 and 3, and the output therefrom is applied to the amplifier 42 corresponding to the amplifier 42 in Fig. 3, through the capacitor 60. The usual resistors 61 and 62 are provided for applying plate potential to the tubes 34 and 37 and to provide a ground connection from the grid of the tube 42. The output from the tube 42 is fed through the transformer to the meter 41, as in Fig. 3. In this form of the invention, as in the form shown in Figs. 2 and 3, the cathodes of the amplifier tubes are all connected to ground through an appropriate resistor 51 in order to provide proper grid bias, and this resistor is shunted by a capacitor 52.

Fig. 5 shows only a modified form of mixer which may be used in any of the preceding forms of the invention. In this mixer the tubes 34 and 37 are provided, as in other mixer circuits, but the output therefrom is fed in through the push-pull primary of the transformer 53. The secondary of this transformer has only a single winding which impresses the output upon the grid of the tube 42. It will be apparent that this mixer circuit, like those previously described, impresses on the tube 42 only the difference in the outputs of the tubes 34 and 37. When this circuit is used, the phase of the voltage taken directly from the oscillator is adjusted to be in phase with the output of the equipment being tested, due to the difference between the action of the push-pull transformer and the direct connection of the plates, as in Figs. 2, 3 and 4.

The circuit shown in Fig. 6, although apparently somewhat more complicated, is inherently the same as the foregoing device, but represents a commercial form of my invention which is adapted not only for distortion measurement but also for noise measurement.

In this form of the invention, the rectifier tube 54 and the tubes 34, 37, 24 and 26, respectively, perform the same functions in the same manner as the tubes already described having these reference numerals assigned thereto.

In the circuit here shown, and with the resistance values indicated on the drawings, the tube 54 is preferably an RCA 1V, tubes 34, 37 and 24 are preferably RCA type 6C5, and tube 26 is preferably an RCA type 6N7, while the rectifier tube 70 in the power supply circuit is preferably an RCA type 5Z4, although any equivalent type of full wave rectifier may be used.

110 volt, 25 to 60 cycle A. C. power supply is connected to the apparatus through the plug 71 and the switch 72, and the current passes through the usual transformer 73 which is provided with the customary heater winding and high voltage winding for the rectifier tube 70, and the usual winding 74 for heating the cathodes of the other tubes in the apparatus. From this rectifier, the current passes through the filter 75, which may be of any customary type, for example, the condenser nearest the rectifier tube may have a value of one microfarad, and the other two condensers a value of eight microfarads, while the chokes shown may have a value of 30 henrys. This power supply unit, of course, provides plate and grid potential for all of the tubes in the apparatus.

The input from the oscillator is applied across the pair of terminals 76. The oscillator is preferably center tapped, with the center tap grounded and connected to the grounded terminal 76'. This input from the oscillator passes through the reversing switch 47 and is applied across the center tap resistor 77, whence it passes through the lead 78 to the phase shifting network 14. This phase shifting network is designed to produce a total phase shift of approximately 180° through its entire range. In this network, the capacitors shown at the top, and corresponding to the capacitors 30 in Fig. 4, may have values as indicated in the drawings, reading from left to right, of .001 mfd., .01 mfd., .1 mfd., .25 mfd., respectively, while the values of the resistors, likewise reading from left to right are as follows, in ohms: 3900, 4700, 4700, 6800, 8200, 12,000, 27,000, 39,000, 56,000, 6800, 8200, 10,000, 12,000, 22,000, 33,000, 56,000, 6800, 10,000, 12,000, 15,000, 33,000, 39,000, 82,000.

With this arrangement, the variable resistor 79 should have a range of 0 to 250,000 ohms, the resistor 80 a value of 8200 ohms, the resistor 81 a value of 33,000 ohms, and the resistor 82 a value of 150,000 ohms.

The output from this phase shifter is fed through the lead 83 and through the switch 84, to the grid of the tube 34. This switch 84, as shown, keeps the output from the phase shifting network connected with the tube 34 over approximately half of its points, for distortion measurement, and when moved to the other points indicated at the lower portion of the switch, the tube 34 is disconnected, as the apparatus is used in these switch positions for noise measurement. The output from the tube 34 passes through the lead 85 to one side of the transformer 63 which functions in the manner above described in connection with Fig. 5.

Input from the apparatus to be measured may be applied across the terminals 53 if it be radio frequency, across the terminals 86 if it be audio frequency, or across the primary of the transformer 87 if it be from a balanced audio circuit. The selector switch 88 is provided for selectively connecting the input of the apparatus to such terminals as may be in use. The input, after passing through the fine control 18, passes to the switch 89 which has a number of points corresponding to the switch 84. In all the upper positions, the input is attenuated through the resistor 90 and the potentiometer 20, whence it is fed to the tube 37.

On the lower points of the switch 89 (at which time only the lower points of the switch 91 are used), the resistor 90 and the resistor 92 are removed from the circuit and the entire input potential is applied across the potentiometer 20 for the purposes of noise measurement. The output from the tube 37 passes through the lead 93 to the transformer 63, into which it is fed in opposition to the output from the tube 34.

The output from this transformer 63 which, as in Fig. 4, is taken from a single secondary, is applied across the potentiometer 94, which has a resistance of 250,000 ohms and from which the output moves to the attenuator switch 23, whence it passes through the lead 95 to the amplifier tube 24. The output from the tube 24 passes to the second attenuator 25, whence it is fed through the lead 96 to the two grids of the tube 26, connected in parallel. The output from the two plates of this tube 26 is fed to the primary of the transformer 43, whence it passes, as before described, to the meter 27.

In order to give a full and complete description of how my invention may be performed, I have indicated the values of the various resistors in the circuit on the drawings, but it will be apparent to those skilled in the art that these specific values need not be followed so long as the principles involved in my invention are adhered to.

In Fig. 7 I have shown a front view of the dial and the control knob used on my apparatus, and indicated as "control knob" in Fig. 6. This is connected to all of the switches 84, 89, 91, 23 and 25, as indicated in dashed lines in Fig. 6. The several points indicated on the dial in Fig. 7 correspond in clockwise direction with the points of the switches shown in Fig. 6, from top to bottom, respectively.

It will be apparent to those skilled in the art, from a consideration of Fig. 7 in conjunction with Fig. 6, that at the uppermost point the readings of the meter 27, at full scale deflection, will correspond to 1% distortion in the apparatus under test; at the second point to 3%; at the third point to 10%; at the fourth point to 30%; and at the fifth point to 100%. When the control knob reaches the sixth point, marked "Cal." on the dial, only the oscillator is connected through the phase shifter for the purpose of calibration. At the seventh point, marked "Ref." on the dial, only the input from the equipment under test is connected to the apparatus. When the switch is placed at this point, the output of the apparatus under test is brought to whatever reference level it is desired to use. The potentiometer 94 is then adjusted to bring the meter reading at 27 to full scale deflection. Input to the apparatus under test is then removed and the control knob is then turned clockwise until the reading on the meter falls within its range. The successive points clockwise from the marking "Ref." remove attenuation in the circuit, thereby increasing the sensitivity of the test apparatus and permitting readings of increasing sensitivity until, at the point marked "—60 DB", noise produced by the apparatus under test having a volume of 60 db. below the reference level will produce full scale deflection on the meter 27.

It will thus be apparent that I have produced an apparatus which is not only a distortion meter, but which can also be used for measuring noise produced in the apparatus without any modification in the connections to that apparatus and without any substitution of equipment.

It will also be apparent, to those skilled in the art, that this apparatus, within the scope of my invention, is subject to many modifications and substitutions of equivalents. For example, the phase shifter, as shown and described in any of the several species of the invention, may be placed in the side of the apparatus connected to the apparatus under test, instead of being connected between the oscillator and the testing apparatus. As before described, any appropriate type of meter may be used at 27, although for commercial use I prefer to use a copper oxide rectifier type of voltmeter. Likewise, other types of vacuum tubes or attenuators may be substituted and the number thereof may be increased or decreased according to the requirements of volume range.

Having now described my invention, I claim:

1. The method of measuring distortion in electrical apparatus comprising the steps of providing an effectively undistorted electrical wave of the desired frequency, passing a portion of said wave into the apparatus to be tested, adding to the output wave from said apparatus a wave from the original source in opposite phase, and measuring the algebraic sum of said waves.

2. The method of measuring electrical distortion comprising passing an effectively undistorted wave into the apparatus to be tested, adding to the output from said apparatus a portion of said undistorted wave in opposite phase and with an amplitude corresponding to the amplitude of the fundamental frequency of the output of the apparatus under test, and measuring the residual output.

3. Apparatus of the class described comprising means for passing an effectively undistorted electrical wave into a mixer, means for passing the same wave into the apparatus under test, means for passing the output from the apparatus under test to the said mixer, means for adjusting the phase relation of said undistorted wave and said output in said mixer to opposition, and means for measuring the output from said mixer.

4. Apparatus of the class described comprising means for passing an effectively undistorted electrical wave into a mixer, means for passing the same wave into the apparatus under test, means for passing the output from the apparatus under test to the said mixer, means for adjusting the phase relation of said undistorted wave and said output in said mixer to opposition, and means for measuring the output from said mixer, the said output measuring means including a rectifying voltmeter.

5. Apparatus of the class described comprising means for passing an effectively undistorted electrical wave into a mixer, means for passing the same wave into the apparatus under test, means for passing the output from the apparatus under test to the said mixer, means for adjusting the phase relation of said undistorted wave and said output in said mixer to opposition, means for attenuating the output from said mixer, and means for measuring the output from said attenuator.

6. Apparatus of the class described comprising means for passing an effectively undistorted electrical wave into a mixer, means for passing the same wave into the apparatus under test, means for passing the output from the apparatus under test to the said mixer, means for adjusting the phase relation of said undistorted wave and said output in said mixer to opposition, means for amplifying the output from said mixer, and means for measuring the output from said amplifier.

7. Apparatus as defined in claim 3 including means for measuring the output from said apparatus under test only.

8. Apparatus as defined in claim 4 including means for measuring the output from said apparatus under test only.

9. Apparatus as defined in claim 6 including means for measuring the output from said apparatus under test only.

10. Apparatus as defined in claim 3 wherein the mixer consists of two thermionic amplifiers having their grids connected respectively to the said source of undistorted waves and the output of said apparatus under test and having their anodes connected together.

11. Apparatus as defined in claim 6 wherein the mixer consists of two thermionic amplifiers having their grids connected respectively to the said source of undistorted waves and the output of said apparatus under test and having their anodes connected together.

12. Apparatus as defined in claim 3 wherein the mixer consists of two thermionic amplifiers having their grids connected respectively to the said source of undistorted waves and the output of said apparatus under test and having their anodes connected together through opposed primary windings of a transformer.

13. Apparatus as defined in claim 6 wherein the mixer consists of two thermionic amplifiers having their grids connected respectively to the said source of undistorted waves and the output of said apparatus under test and having their anodes connected together through opposed primary windings of a transformer.

GILBERT SWIFT.